May 27, 1969

H. C. HERVIG ET AL 3,446,741

INSULATING DEVICE, COMPOSITION, AND METHOD

Filed Nov. 14, 1963

INVENTORS
HAROLD C. HERVIG
EDWARD E. LEACH
BY
Carpenter, Abbott, Coulter & Kinney
ATTORNEYS

United States Patent Office 3,446,741
Patented May 27, 1969

3,446,741
INSULATING DEVICE, COMPOSITION, AND METHOD
Harold C. Hervig, St. Paul, and Edward E. Leach, White Bear Lake, Minn., assignors to Minnesota Mining and Manufacturing Company, St. Paul, Minn., a corporation of Delaware
Filed Nov. 14, 1963, Ser. No. 323,740
Int. Cl. H01b 3/40
U.S. Cl. 252—63                                    4 Claims

ABSTRACT OF THE DISCLOSURE

Small resin-encapsulated droplets of liquid dielectric materials added as fillers to self-curing liquid resins of the same specific gravity remain stably suspended and prevent excessive exotherm and void formation in the cured resin.

---

Figure 1:
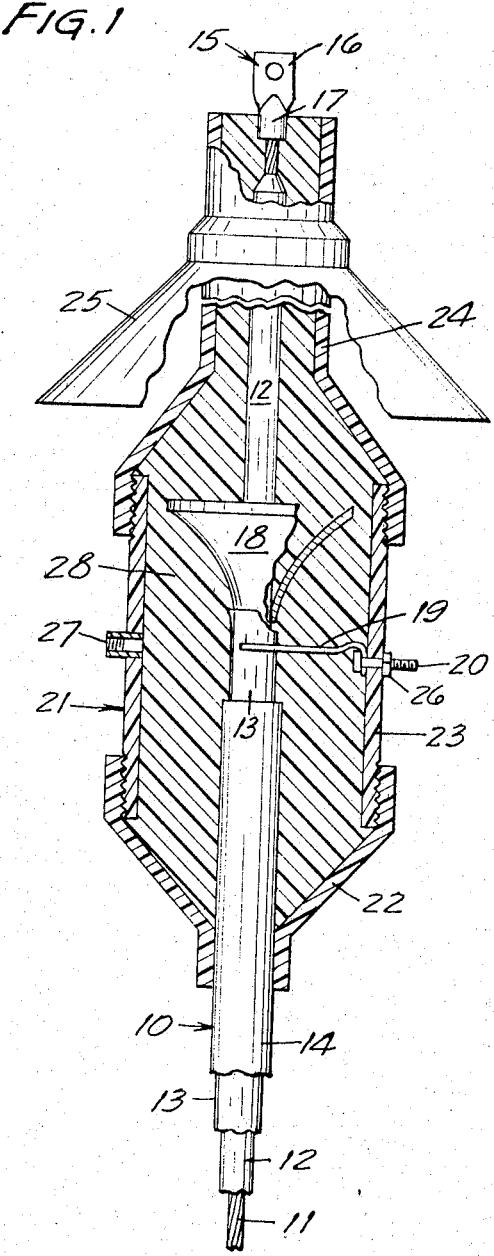

This invention relates to electrical insulation, and in particular to self-hardening resinous insulating compositions and to the insulating therewith of electrical apparatus.

Many self-curing resinous compositions are known to provide resinous castings having high dielectric strength and other desirable characteristics of electrical insulation. An outstanding example is the class of resinous materials known as epoxy resins, prepared for example from bisphenol and epichlorohydrin. These resins in liquid form, when mixed with suitable catalysts and curing agents, react rapidly and with evolution of considerable heat to form strong, hard, tough resinous castings having many of the required properties of electrical insulating materials. Accordingly they have been found useful in the encapsulating of cable splices and in other applications. One such use is mentioned in Bollmier et al. U.S. Patent No. 2,967,795 wherein is described the introduction of the self-curing resin composition under pressure into a porous coil of open-mesh plastic screen surrounding a cable splice area. The cured mass has high dielectric and mechanical strength and provides fully adequate protection.

In many instances it is impossible to wrap the splice area with plastic screen, or for other reasons it may be desirable to omit the porous packing material and to use a rigid mold into which to introduce the liquid resin. Under such conditions it frequently happens that the exothermic curing reaction of the mass of resin causes an excessive rise in temperature, the resin expands excessively while hardening, and the hardened resin on cooling and contracting is subjected to strains sufficient to cause cracking, void formation, or other visible or incipient degradation.

Attempts have previously been made to reduce the heat output of the resinous mass by introduction of quantities of inert fillers or diluents. Heavy loadings of clean sand or of mica flakes incorporated in the liquid resinous composition do in fact lower the exotherm and reduce the tendency toward mechanical failure, but the material separates rapidly on standing in liquid form, and the cured product is unduly heavy.

An important application of liquid self-curing resins which aptly illustrates the difficulties encountered with sand loadings is the preparation of high voltage cable terminations. The high voltage makes necessary an essentially void-free dense homogeneous structure so that corona discharge may be prevented. The intricate structure requires a fluid insulating material capable of penetrating into and completely filling the crevices and open areas. Heating, and heat-induced expansion, must be kept to a minimum so that unnecessary strains within the structure may be avoided. Any separation of components during introduction of the resin has a tendency to plug the narrow openings and prevent free access of the resin, and at the same time to leave a resin-rich portion having unduly high exotherm. For these and other reasons the art has heretofore experienced great difficulty in obtaining fully satisfactory high voltage cable terminations.

The present invention makes possible the production of high voltage cable terminations of consistently high quality, by supplying an improved self-curing liquid resinous composition which resists separation of components under prolonged standing, and cures without excessive temperature build-up to a dense strong uniform resinous structure of excellent electrical and mechanical properties.

It has now been found that droplets of liquid insulating materials, such for example as transformer oils, encapsulated or otherwise contained within thin imperforate spheroidal shells to provide "microcapsules" having essentially the same density as conventional self-curing liquid epoxy resin compositions, are capable of serving as inert particulate loadings for self-curing epoxy resin compositions and the like in providing cast-in-place resinous insulation of consistently high quality.

Figure 2:
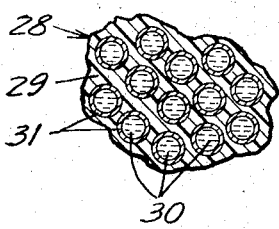

In the drawing,

FIGURE 1 represents a completed high voltage cable termination in longitudinal cross-section, and FIGURE 2 represents in cross-section a portion, greatly enlarged, of the loaded cured resinous filler.

The cable 10 comprises a stranded wire conductor 11 covered with an insulating layer 12, a thin conductive shield 13, and an outer tubular sheath 14. An end lug 15 comprising a flat perforate terminal 16 supported on an open cup 17 is soldered to the bared end of the conductor 11. An open-ended conductive stress cone 18 fits snugly over the insulation 12 and makes conductive contact with the outwardly flared exposed end of the shield 13. The latter is externally grounded through a flexible lead 19 which is soldered to the shield and attached to a stud 20. The assembly is contained within an insulating shell 21 comprising a conical base 22, a tubular body 23, a funnel-shaped cap 24 having an extended stem, and one or more conical terminal shields 25. The stud 20 passes through the body 23 and is held in place by a nut 26, the stud being externally connected to ground by means not shown. The body 23 is also provided with a resin entry port 27 which may if desired contain a one-way valve, not shown.

The space remaining within the shell is completely filled with a hardened resinous composition 28 indicated in FIGURE 2 as comprising a hard resin matrix 29 filled with tiny microspheres of an insulating liquid 30 encapsulated in thin spheroidal imperforate shells 31.

The practice of the invention will now be further described in terms of an illustrative but non-limiting example, all proportions being by weight unless otherwise indicated.

A precondensate is first prepared by mixing together 87 lbs. of 37% formaldehyde solution, 217 ml. of triethanolamine, and 32.4 lb. of urea, and holding the mixture at 70° C. for one hour. The precondensate is diluted with 158.5 lbs. of water. To the solution there is added 82 ml. of concentrated hydrochloric acid and 70.5 lb. of transformer oil, a noncorrosive, highly refined, low viscosity mineral oil having a specific gravity of about 0.96. The mixture is vigorously agitated until the oil is dispersed in the form of very small droplets. There is then added 98 ml. of hydrochloric acid and the temperature is held at 28–30° C. for twelve minutes, after which an additional 131 ml. of the acid in 60 lbs. of water is added slowly over a five minute period. The oil droplets, now partially protected by a resinous shell, are inspected for particle size and suitable adjustment of the rate of agitation is made where necessary, an increase in agitation at this point resulting in a further decrease in particle size. The resin-forming reaction is allowed to continue for one hour at 30° C. followed by several hours at 40° C.

The resulting microcapsules, having an external spheroidal imperforate resinous shell surrounding a liquid center, are recovered by filtering, washed well with water, and dried in thin layers on trays in an oven at 60–80° C. Analysis shows the microcapsules to range between about 5 and about 60 microns in diameter, by far the major proportion being in the preferred range of about 25 to about 30 microns. The oil content makes up about 50 to about 80 percent of the total weight, being about 65 percent in the preferred size range, at which ratio the specific gravity of the particles is approximately 1.05.

A self-curing resinous composition is prepared by mixing together 100 parts by weight of liquid epoxy resin (Epon 828 resin) and 11.5 parts of triethylenetetramine. The mixture has a specific gravity of about 1.05 and is a thin liquid at room temperature as first prepared, but soon reacts exothermally to a hard tough resin. To the mixture as first prepared there is added 23.5 parts by weight of the dry and free-flowing microcapsules. The initial viscosity of the mixture, measured at 28° C., is 7500 centipoises. The mixture is forced under pressure into a pre-assembled cable termination unit as hereinbefore described, through the entry port 27 and in an amount sufficient to fill the casing to the upper end of the cap 24. If desired the narrow opening at the upper end between casing and cable may be closed, except for air vent openings, for example by wrapping with pressure-sensitive adhesive tape. The composition is then permitted to harden.

Terminations prepared as described are found to provide consistently superior results in terms of resistance to degradation under high voltage use conditions, as compared to terminations filled either with unmodified resins or with resins containing conventional loadings of sand, mica, or similar dielectric particles. Destructive inspection of terminations has indicated that the microsphere loadings provide assurance of essentially complete uniformity, reduced strains as evidenced by absence of cracks or fissures, complete fill of all open spaces, and generally superior properties in the completed product.

A possible explanation of the advantages obtained may be gleaned from the results of test samples prepared with comparative mixtures containing microcapsules and mica flakes as inert loadings. At a total volume of 78 ml. of the mixture in a three ounce cup, the formulation just given, having an initial viscosity of 7500 cps., reached a maximum temperature in 35 minutes of 325° F. Substitution of mica flakes for the microcapsules in an amount designed to give a roughly equivalent initial viscosity, i.e. using 45 parts of mica in place of the 23.5 parts of capsules, provided an initial viscosity of 9300 cps. and a temperature increase of 336° F. in 42 minutes. With 70 parts of mica, i.e. at a volume loading equivalent to that of the microcapsules, the initial viscosity was 22,200 cps. This mixture reached a maximum temperature of 295° F. in 46 minutes. Viscosities greater than about 10,000 cps. have been found to cause difficulty in obtaining effective filling of the casing by hand pumping as customarily used in these operations.

Similar results were obtained with another test series. In this case the mixture contained 100 parts of Epon 828 liquid epoxy resin and 10 parts of diethylene triamine, and the volume of the sample was 115 ml. With 23.5 parts of the capsules, the initial viscosity was 11,000 cps. at 24° C. and a maximum temperature of 315° F. was reached in 32 minutes. With 50 parts of mica the viscosity was 15,500 cps., the maximum temperature 345° F., and the time required, 40 minutes. At 70 parts of mica the results were 22,000 cps., 310° F., and 44 minutes.

Transformer oil is a well-known liquid dielectric and is particularly useful in the practice of the invention, but other liquid dielectric materials may also be used. Liquid "Aroclor" chlorinated biphenyls are particularly useful either alone or in admixture with mineral oil where microcapsules of increased specific gravity are desired. The specific gravity of the capsules may also be altered to a slight extent by control of the shell thickness within the approximate limits hereinbefore indicated. Shells prepared from other resins, or resinous or film-forming materials, are also useful in the microencapsulation of liquid dielectrics and such materials may be substituted for the aminoplast resin of the foregoing illustrative embodiment.

The composition of the self-curing resinous composition may likewise be widely varied. Various liquid epoxy resins may be substituted in whole or in part for the specific material here described, an example being replacement of one-tenth of the "Epon 808" resin by an equal weight of epoxidized 1,4-butanediol. Other catalysts and curing agents may replace the primary amines specified. Examples are aminoethyl piperazine, "Versamid 250" amino resin, and "DMP–30" tertiary amine. Dyes or pigments may also be added where introduction of color is desirable.

A particularly convenient means for mixing and introducing these compositions is that described in the Bollmeier et al. Patent No. 2,967,795 previously mentioned. The epoxy resin and the catalyst or curing agent are sealed within separate compartments of a plastic mixing envelope, the microcapsules being included in either or both of the compartments. Rupture of a membrane or seal separating the two compartments permits the components to be mixed together. The mixture is then expelled from the envelope through an appropriate opening or nozzle and into the termination casing through the entry port 27, under pressure supplied by a hand-operated pump or gun member.

Loadings of capsules up to about one-third the volume of self-curing resin and capsules are effective where the resinous components are sufficiently low in viscosity. The large loadings give maximum reduction in exotherm and therefore are desirable for reducing the heating effect and the strains occasioned thereby. Much smaller loadings may be used, as low as one-tenth by volume still providing a useful control of the heating effect.

What is claimed is as follows:

1. A liquid composition suitable for pressure injection into a high voltage cable termination casing to provide essentially uniform and void-free encapsulation of said termination, comprising a temporarily liquid self-curing resin composition containing, uniformly interspersed therethrough, a loading of small inert spheroidal particles each having a diameter within the range of about 5 to about 60 microns, a specific gravity substantially equal to that of said liquid resin composition, and comprising a droplet of a liquid dielectric contained within a surrounding imperforate resinous shell.

2. A liquid composition suitable for pressure injection into a high voltage cable termination casing to provide essentially uniform and void-free encapsulation of said termination, comprising a temporarily liquid self-curing resin composition including a liquid epoxy resin and an amine curing agent for said resin, and containing, uniformly interspersed therethrough, a loading of about one-fifth the total volume of small inert spheroidal particles each having a diameter of about 25 to about 30 microns, a specific gravity differing from that of said resin composition by not more than about 0.05, and comprising a droplet of a liquid dielectric oil contained within a surrounding thin imperforate aminoplast resin shell and wherein said oil represents about 50 to about 80 percent by weight of the weight of said particle.

3. In the preparation of a temporarily liquid composition suitable for pressure injection into a high voltage cable termination casing to provide essentially uniform and void-free encapsulation of said termination and including a hardenable liquid resin and a liquid curing agent for said resin, the steps of (1) mixing into at least one of said resin and said curing agent a quantity of small inert spheroidal particles each having a diameter within the range of about 5 to about 60 microns, a specific gravity substantially equal to that of the mixture of said resin and curing agent, and comprising a droplet of a liquid dielectric contained within a surrounding imperforate resin shell, the total quantity of said particles amounting to about one-tenth to about one-third the total volume of said composition, and then (2) mixing together the two liquids to form a stably homogeneous free-flowing liquid which cures without excessive exotherm.

4. The method of claim 3 wherein the resin is a liquid epoxy resin, the curing agent is an amine, the total quantity of said particles amounts to about one-fifth the total volume of said composition, and the particles have a diameter of about 25 to about 30 microns and a specific gravity differing from that of the mixture of resin and curing agent by not more than about 0.05, and wherein said liquid dielectric is an oil, said resin shell is an aminoplast resin, and said oil represents about 50 to about 80 percent by weight of the weight of said particle.

References Cited

UNITED STATES PATENTS

| | | | |
|---|---|---|---|
| 2,806,509 | 10/1957 | Bozzacco et al. | 260—37 |
| 3,016,308 | 1/1962 | Macaulay | 252—316 XR |
| 3,079,289 | 2/1963 | George et al. | 161 |
| 3,087,606 | 4/1963 | Bollmeier et al. | 174—87 |
| 2,788,327 | 4/1957 | Ross et al. | 252—63.7 |
| 2,868,730 | 1/1959 | Hughes et al. | 252—63.7 |
| 2,967,901 | 1/1961 | Priaroggia | 174—73 |
| 3,018,318 | 1/1962 | Franklin | 174—73 |

LEON D. ROSDOL, *Primary Examiner.*

J. D. WELSH, *Assistant Examiner.*

U.S. Cl. X.R.

117—100; 174—110, 73, 137; 252—63.7, 64; 260—37